United States Patent [19]

Nakao

[11] Patent Number: 4,748,476
[45] Date of Patent: May 31, 1988

[54] AUTOMATIC SCANNER LENS SELECTOR FOR USE WITH PHOTOGRAPHIC PRINTER

[75] Inventor: Hiroto Nakao, Wakayama, Japan

[73] Assignee: Noritsu Kenkyu Center Co., Ltd., Wakayama, Japan

[21] Appl. No.: 62,647

[22] Filed: Jun. 16, 1987

[30] Foreign Application Priority Data

Jun. 20, 1986 [JP] Japan .................................. 61-145598
Mar. 3, 1987 [JP] Japan .................................. 62-49173

[51] Int. Cl.⁴ ...................... G03B 27/44; G03B 27/74; G03B 27/80
[52] U.S. Cl. ...................................... 355/46; 354/481; 355/68
[58] Field of Search ...................... 354/476, 481, 483; 355/68, 8, 11, 46, 71, 66, 55, 56

[56] References Cited

U.S. PATENT DOCUMENTS

| | | | |
|---|---|---|---|
| 3,826,571 | 7/1974 | Spence-Bate | 355/46 |
| 3,951,545 | 4/1976 | Lucht | 355/46 |
| 4,027,968 | 6/1977 | Spence-Bate | 355/46 |
| 4,232,962 | 11/1980 | Saver | 355/71 X |
| 4,299,480 | 11/1981 | Gilkeson et al. | 355/66 |
| 4,316,658 | 2/1982 | Bundschuh et al. | 354/483 X |
| 4,433,906 | 2/1984 | Nakatani et al. | 355/684 |
| 4,486,087 | 12/1984 | Carcia et al. | 354/481 X |
| 4,490,031 | 12/1984 | Mineshima | 354/481 X |
| 4,583,845 | 4/1986 | Lucht et al. | 355/46 |
| 4,690,548 | 9/1987 | Holm | 355/68 X |

Primary Examiner—Richard A. Wintercorn
Attorney, Agent, or Firm—Armstrong, Nikaido, Marmelstein & Kubovcik

[57] ABSTRACT

An automatic lens selector has a lens deck into which one of a plurality of lens plates each carrying a printing lens of different magnification is inserted, and a scanner body provided with a built-in receptor and a lens holder carrying a plurality of scanner lenses. A pair of motion converters are provided therebetween for converting a linear motion of the lens plate inserted into the lens holder to a motion of the lens holder to automatically bring one of the scanner lenses into alignment with the optical axis of the receptor. A proper scanner lens is automatically selected by inserting a respective lens plate into the lens deck.

1 Claim, 4 Drawing Sheets

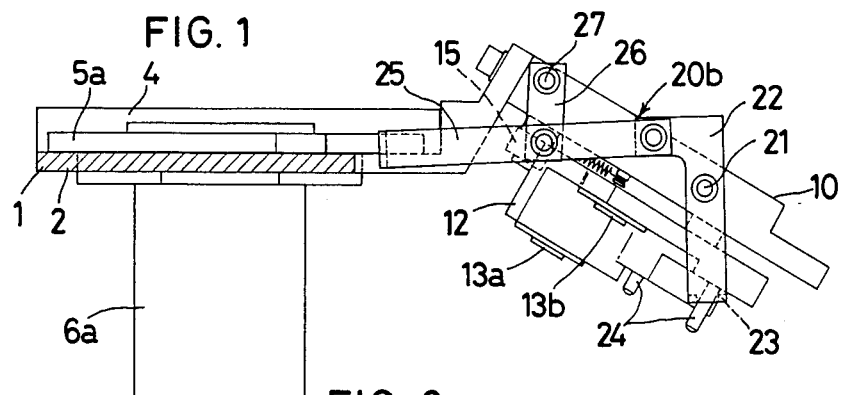
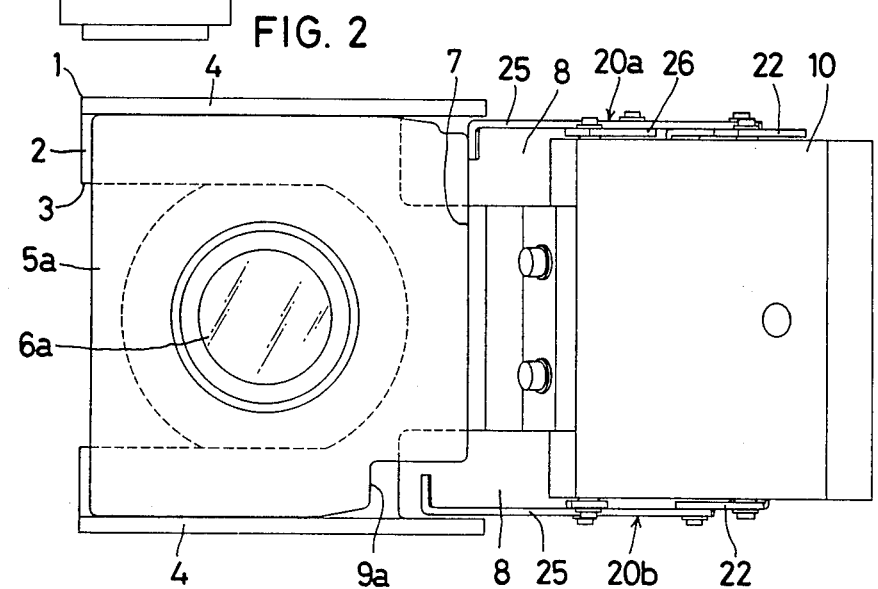
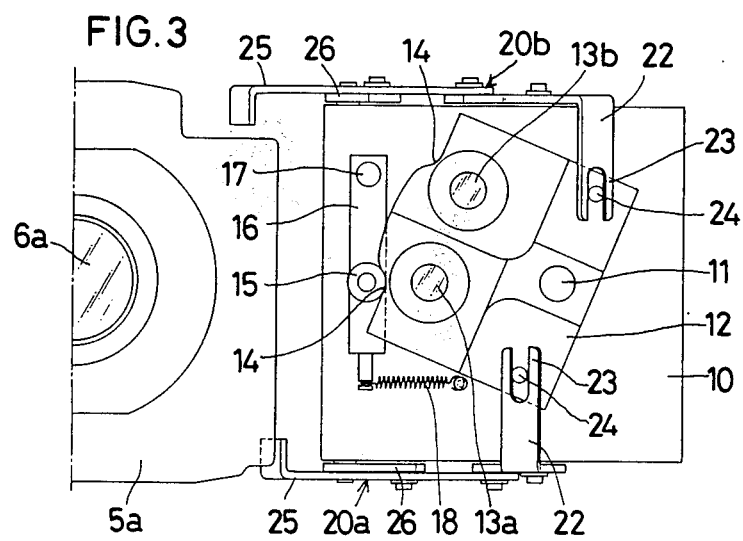

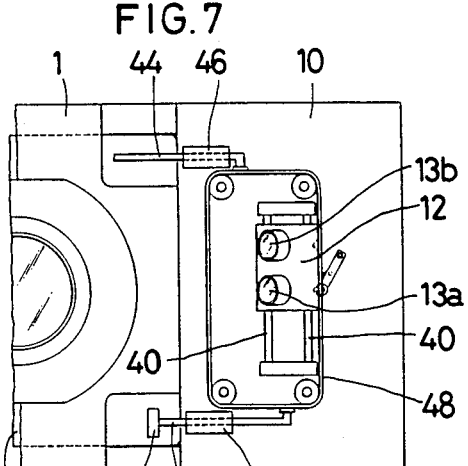
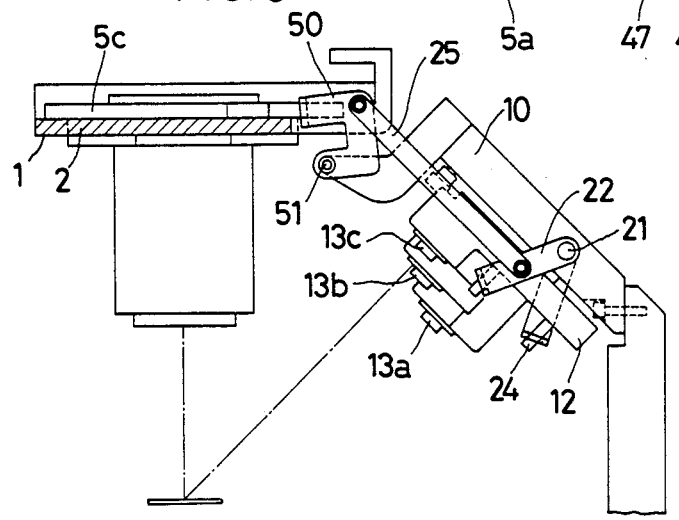
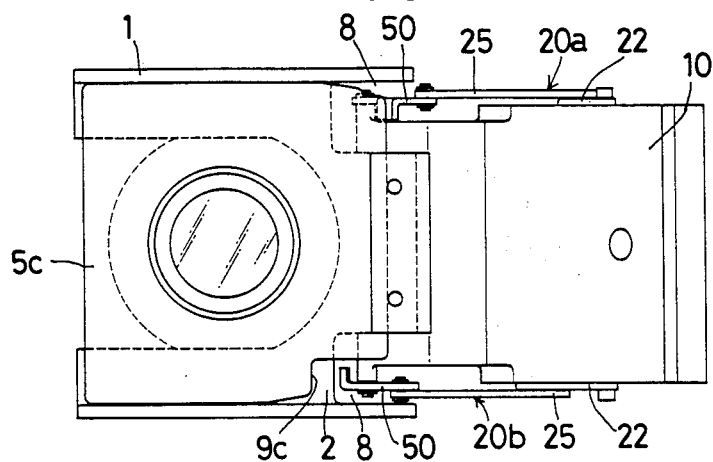

AUTOMATIC SCANNER LENS SELECTOR FOR USE WITH PHOTOGRAPHIC PRINTER

The present invention relates to an automatic scanner lens selector for use with a photographic printer.

With a known printer for printing the negative color images of negative films on color paper, a scanner scans the pattern, density and color of the negative color images and the output signals from the scanner are used to automatically adjust the intensity of the light to be emitted on the color paper as well as the color balance.

Negative films of various sizes are used such as disk films, 110 mm films, 120 mm films and 135 mm films. When color paper is printed with a printer having a scanner, it is necessary to replace the printing lens as well as the scanner lens every time the size of a negative film changes.

Since the replacement of the scanner lens has heretofore been made manually, it was time-consuming. Inadvertent failure of change of the magnification of lenses or mistake in setting the magnification sometimes took place.

An object of the present invention is to provide an automatic scanner lens selector which obviates the abovesaid shortcomings and which makes it possible to automatically replace a scanner lens by replacing a lens plate for printing.

With the present invention, since the insertion of a lens plate into the lens deck is associated with the replacement of a scanner lens, a proper scanner lens is automatically and reliably selected every time a lens plate is replaced without any trouble such as an error in the magnification setting.

Other features and objects of the present invention will become apparent from the following description taken with reference to the accompanying drawings, in which:

FIG. 1 is a vertical sectional side view showing an embodiment of the automatic lens selector assembly in accordance with the present invention;

FIG. 2 is a plan view of the same;

FIG. 3 is a bottom view of the same;

FIGS. 6 and 7 are bottom views of further embodiments;

FIG. 8 is a vertical sectional side view of a still further embodiment;

FIG. 9 is a plan view of the same; and

Figure 4:
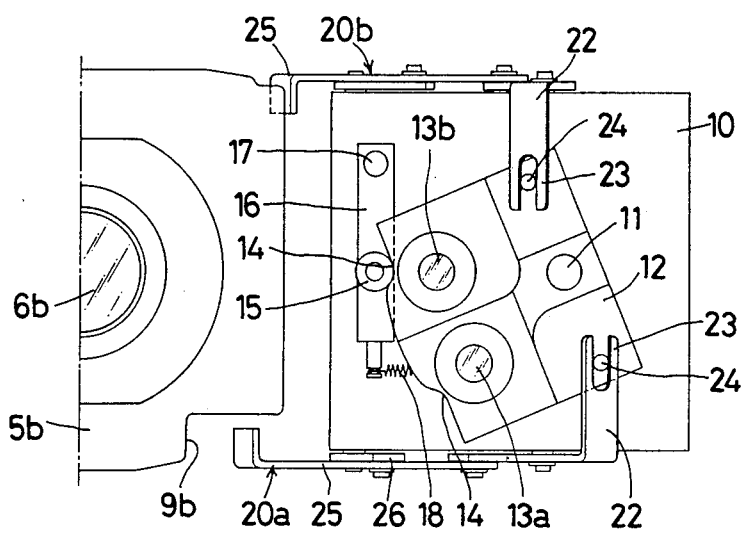
FIG. 4 is a bottom view similar to FIG. 3 but with the position of lenses changed.

Now, referring to FIGS. 1 to 3, a lens deck 1 is provided with a bottom plate 2 formed with a cutout 3 having its front edge open to allow a lens to pass. At both sides of the bottom plate 2 are provided a pair of side plates 4. Two kinds of lens plates 5a, 5b can be detachably inserted in between the side plates 4.

One lens plate 5a carries a lens 6a for printing disk films, and the other one 5b carries a lens 6b for printing 110 mm films or the one for printing 135 mm films. Either of the lens plates 5a, 5b is inserted in the lens deck 1 until it butts against a stepped portion 7 formed on the upper surface of the bottom plate 2 so as to be locked in position.

To the rear of the lens deck 1 is coupled the upper part of a scanner body 10 with a built-in receptor (not shown). The optical axis of the receptor of the scanner body 10 forms a predetermined angle with respect to the optical axis of the lenses on the lens plates 5a, 5b.

A scanner body 10 is provided with a shaft 11 protruding from the rear portion of its inclined lower surface. A lens holder 12 is pivotally mounted on the protruding shaft 11. It carries a lens 13a for disk negative films and a lens 13b for a 110 mm film or 135 mm film on the circumference having its center on the protruding shaft 11 and crossing the optical axis of the receptor of the scanner body 10.

The lens holder 12 is also formed with a pair of recesses 14 in its front end at both sides. Over the lens holder 12 is arranged a positioning arm 16 having a roller 15 adapted to engage either of the recesses 14. The positioning arm 16 is, as shown in FIG. 3, pivotally mounted on a pin 17 at one end thereof, and is provided at the other end with a spring 18 to bias the positioning arm 16 toward the lens holder 12. Thus, the roller 15 is pressed against the upper surface of the lens holder 12 so as to engage one of the recesses 14, thus restraining the lens holder 12 from turning in any direction with one of two scanner lenses 13a, 13b located on the optical axis of the receptor.

The scanner body 10 is provided at both sides with two sets of motion converters 20a, 20b for converting a linear motion of the lens plate 5a or 5b when inserted into a rotary motion of the lens holder 12. One 20a of the two motion converters functions to turn the lens holder 12 clockwise (in the dirction of arrow in FIG. 3), whereas the other motion converter 20b turns it counterclockwise.

The motion converters will be described in more detail. Since the two sets of motion converters 20a, 20b have the same construction, only the motion converter 20b for counterclockwise turning will be discussed here. As to the motion converter 20a for clockwise turning, its parts corresponding to those of the converter 20b are denoted by the same reference numbers in drawings.

The motion converter 20b for couterclockwise turning has a deflection arm 22 having its intermediate portion rockingly mounted to one side of the scanner body 10 by means of a pin 21 (FIG. 1). The deflection arm 22 is bent at one end thereof toward the front side of the scanner body 10 so as to put a forked tip 23 formed at the one end into engagement with a pin 24 protruding from the underside of the lens holder 12. To the other end of the deflection arm 22 is coupled a changeover arm 25. A swing arm 26 has one end coupled to the intermediate portion of the changeover arm 25 and has the other end pivotally coupled to the upper portion of the side surface of the scanner body 10 by means of a pin 27. (FIG. 3)

A free end of the changeover arm 25 is received in one of the openings 8 formed at both sides of the rear end of the bottom plate 2 of the lens deck 1 and is adapted to be pushed by the end face of the lens plate 5a or 5b which is inserted into the lens deck 1.

The lens plate 5b which functions to push the motion converter 20b for counterclockwise turn is formed with a cutout 9b at a position opposite to the changeover arm 25 of the motion converter 20a for clockwise turn (FIG. 4). Similarly, the lens plate 5a adapted to push the motion converter 20a for clockwise turn is formed with a cutout 9a at a position opposite to the changeover arm 25 of the motion converter 20b for conterclockwise turn (FIG. 3).

In use, when the lens plate 5a for disk negative films is inserted into the lens deck 1, the changeover arm 25 for the motion converter 20a for clockwise turn is pushed on its end by the end face of the lens plate 5a (FIG. 3) so as to pivot around the pin 27 coupling the swing arm 26 to the scanner body 10, while moving in the longitudinal direction. The deflection arm 22 pivots around the pin 21 with the movement of the changeover arm 25, pushing the pin 24 provided on the lens holder 12 with its forked piece 23, so that the lens holder 12 turns clockwise about the protruding shaft 11. By inserting the lens plate 5a completely until it butts against the stepped portion 7, the lens 13a for disk negative films will be brought into alignment with the optical axis of the receptor of the scanner body 10 (FIG. 3). The roller 15 of the positioning arm 16 is now received in the recess 14 to prevent the lens holder 12 from turning.

The changeover arm 25 of the motion converter 20b for counterclockwise turn moves toward the lens plate 5a with the clockwise turn of the lens holder 12 until its head is received in the cutout 9a.

When the lens plate 5b for 110 mm negative films or 135 mm negative films is inserted into the lens deck 1, the motion converter 20b for counterclockwise turn will be actuated to turn the lens holder 12 counterclockwise, so that the lens 13b for a 110 mm negative film scanner or a 135 mm negative film scanner will be aligned with the optical axis of the receptor of the scanner body 10 (FIG. 4).

Figure 5:
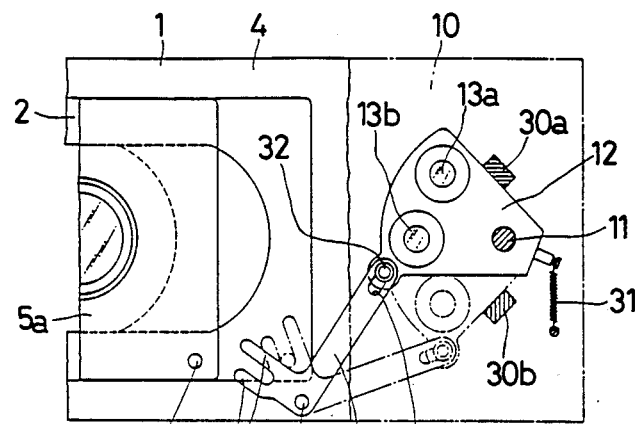
FIG. 5 is a plan view of another embodiment.
Figure 6:
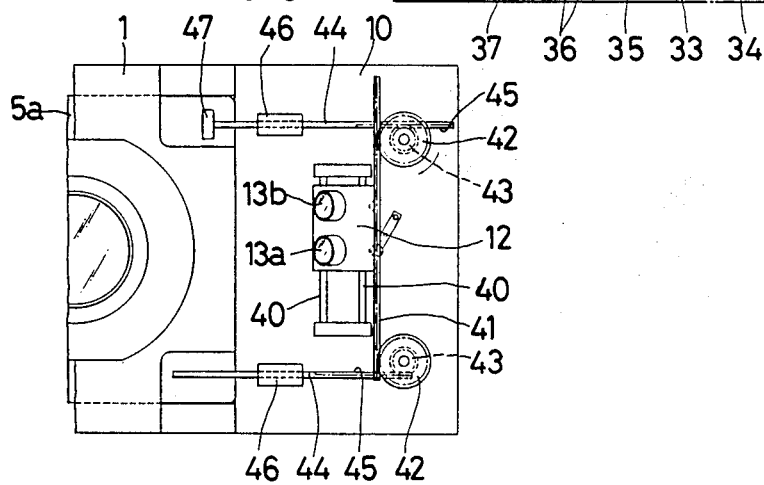

Other embodiments of the automatic lens selector assembly are shown in FIGS. 5 through 7.

In the embodiment shown in FIG. 5, the lens holder 12 adapted to pivot on the protruding shaft 11 is provided with a pair of stopper 30a, 30b to lock the lens holder 12 in position with one of the scanner lenses 13a, 13b supported on the lens holder 12 in alignment with the optical axis of the receptor. The lens holder 12 is normally biassed by a spring 31 into contact with the stopper 30a with the scanner lens 13b in alignment with the optical axis of the receptor.

The lens holder 12 is provided on the outer edge portion of its upper surface with a pin 32 received in a slit 34 formed in one end of an L-shaped changeover arm 33 which has its elbow portion pivotally connected to one side of the upper surface of the lens deck 1 by means of a pin 35.

The changeover arm 33 is provided at the other end thereof with a forked piece 36, which is located in the path of the lens plates 5a, 5b. Only the lens plate 5a is provided with a changeover pin 37 at one side of its upper surface.

In this embodiment, when the lens plate 5a is inserted in the lens deck 1, the changeover pin 37 provided thereon is slid into the forked piece 36. This pivots the changeover arm 33, turning the lens holder 12 counterclockwise so as to put the scanner lens 13a into alignment with the optical axis of the receptor.

Pulling the lens plate 5a out of the lens deck 1 will cause the changeover arm 33 and the lens holder 12 to turn in the reverse direction to put the scanner lens 13b back into alignment with the optical axis of the receptor.

A pin may be provided on the other end of the changeover arm 33 while a forked piece may be secured to the lens plate 5a so that the changeover arm 33 will be rocked when the lens plate 5a is inserted.

In another embodiment shown in FIG. 6, the lens holder 12 having a pair of lenses 13a, 13b is mounted to be movable along a pair of guide rods 40 provided on the bottom surface of the scanner body 10. The lens holder 12 is provided with a rack 41 engaging a pair of pinions 42 rotatably mounted on the scanner body 10

An intermediate pinion 43 is mounted concentrically with each pinion 42 so as to engage rack teeth 45 on a push rod 44 extending in a direction normal to the rack 41. Each push rod 44 is slidably supported by a guide 46 provided on the scanner body 10 and has one end thereof disposed in the path for the lens plates formed in the lens deck 1.

With this embodiment, when the lens plate 5a or 5b is inserted into the lens deck 1, it pushes one of the push rods 44 with its butt plate 47 provided thereon to move the lens holder 12 along the guide rods 40 through the intermediate pinion 43, pinion 42 and rack 41. Thus the scanner lenses 13a, 13b are changed over from one to the other into and out of alignment with the optical axis of the receptor of the scanner body 10. The butt plates 47 are provided on both of the lens plates 5a, 5b but in symmetrical positions so as to push one of the push rods 44.

In another embodiment shown in FIG. 7, the lens holder 12 is supported to be slidable along the guide rods 40 and is coupled to a portion of an endless belt 48 mounted on the lower surface of the scanner body 10. A pair of push rods 44 have one end thereof coupled to the endless belt 48 at opposite positions As in the embodiment shown in FIG. 6, each push rod 44 is supported by a guide 46 on the scanner body 10, having one end thereof disposed in the path of lens plates formed in the lens deck 1.

In this embodiment, when the lens plate 5a or 5b is inserted, the butt plate 47 pushes one of the push rods 44 to slide the lens holder 12 along the guide rods 40 with the travel of the endless belt 48, so that the scanner lenses 13a, 13b are changed over from one to the other into and out of alignment with the optical axis of the receptor of the scanner body 10.

A further embodiment is shown in FIGS. 8 to 12, wherein the lens holder 12 adapted to pivot on the protruding shaft 11 carries a lens 13a for disk negative films, a lens 13b for 110 and 135 mm negative films and a lens 13c for 120 mm negative films so as to be located on the circumference of a circle having its center at the shaft 11 and crossing the optical axis of the receptor of the scanner body 10.

The lens holder 12 is turned by the motion converters 20a for clockwise turn and 20b for counterclockwise turn provided at both sides of the scanner body 10. The deflection arm 22 of each of the motion converters 20a, 20b has one end rockingly mounted on one side of the scanner body 10 by means of the pin 21, and has the other end bent toward the bottom of the lens holder 12 and formed with a slit 23' for engagement with the pin 24 protruding from the lower surface of the lens holder 12.

A changeover arm 25 has one end coupled to the mid-portion of the deflection arm 22 and has the other end coupled to the mid-portion of a U-shaped working frame 50. The working frames 50 have one end thereof coupled to the scanner body 10 by means of respective pins 51, and have the other end inserted in the opening 8 of the lens deck 1 so as to be located over the bottom plate 2.

A lens plate 5a for disk negative films, a lens plate 5b for 110 mm negative films or for 135 mm negative films, or a lens plate 5c for 120 mm negative films is detachably inserted into the lens deck 1.

Figure 10:
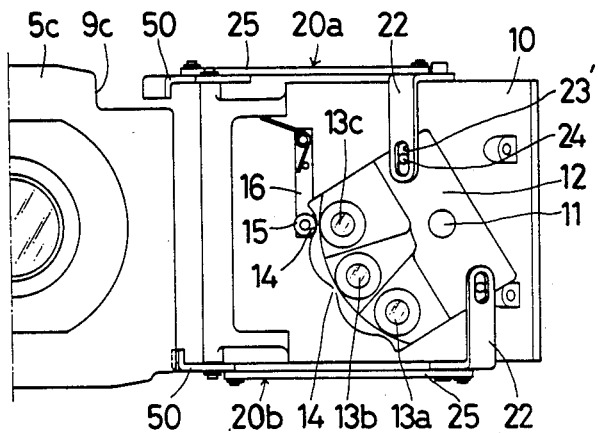
FIGS. 10 to 12 are bottom views of the same showing the lenses in different positions.

FIG. 10 shows the lens deck 1 loaded with the lens plate 5c for 120 mm negative films. When inserted, the lens plate 5c pushes one end of the working frame 50 of the motion converter 20b for counterclockwise turn, turning the lens holder 12 counterclockwise to bring the lens 13c for 120 mm negative films on to the optical axis of the receptor of the scanner body 10. Meanwhile, the end of the working frame 50 for the motion converter 20a for clockwise turn fits in a cutout 9c formed at the end of the lens plate 5c so as not to hinder the lens holder 12 from turning.

Figure 11:
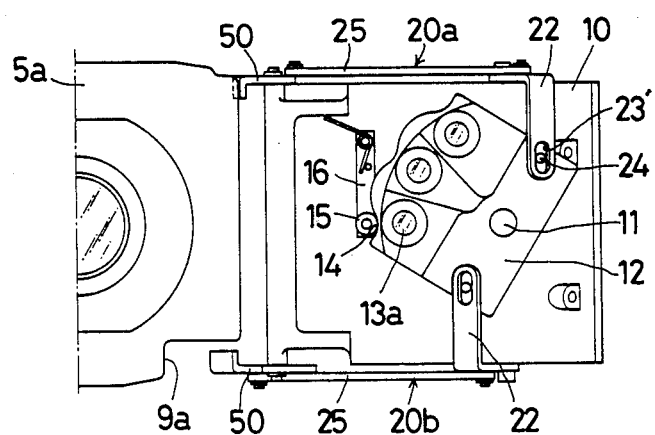

FIG. 11 shows the lens deck 1 with the lens plate 5a for disk negative films inserted therein. By the insertion of the lens plate 5a, the motion converter 20a for clockwise turn functions to bring the lens 13a for disk negative films on to the optical axis of the receptor of the scanner body 10, while the other end of the working frame 50 of the motion converter 20b for counterclockwise turn fits in the cutout 9a formed at the end of the lens plate 5a.

Figure 12:
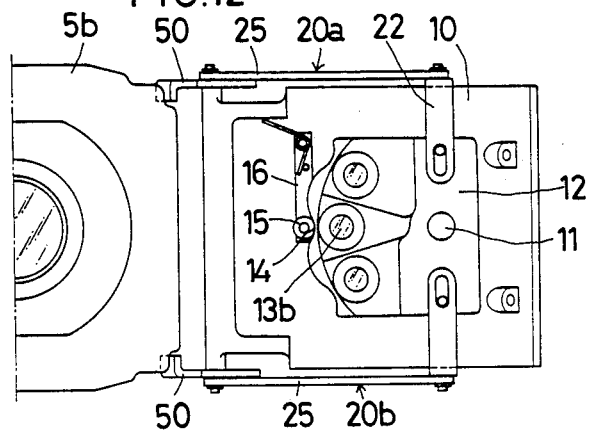

FIG. 12 shows the lens deck 1 with the lens plate 5b inserted therein. By inserting the plate 5b, both the motion converters 20a, 20b will function, putting the lens holder 12 in its neutral position to bring the lens 13b for 110 mm negative films into alignment with the optical axis of the receptor of the scanner body 10.

Any of the lenses aligned with the optical axis of the receptor of the scanner 10 can be held in position by the engagement between one of the recesses 14 formed at the outer periphery of the lens holder 12 and the roller 15 provided on the positioning arm 16.

Although in the above-described embodiments, two or three lenses are mounted on the lens holder 12, the number of lenses is optional. The position of the cutouts to be formed in the lens plate is determined according to the arrangement of lenses mounted on the lens holder 12.

What is claimed is:

1. An automatic scanner lens selector for use with a photographic printer, comprising a lens deck, a plurality of lens plates each provided with a printing lens which differ in magnification from one another, each of said lens plates being adapted to be detachably mounted on said lens deck, a scanner body located ahead of said lens deck and provided with a receptor, a lens holder, a plurality of scanner lenses of different magnifications mounted on said lens holder, said lens holder being mounted on said scanner body so that said lenses will be put on the optical axis of said receptor from one to another, and a plurality of motion converters provided between said lens holder and said lens plate for converting a linear motion of said lens plate inserted into said lens holder to a motion of said lens holder to bring one of said scanner lenses into alignment with the optical axis of said receptor.

* * * * *